(12) United States Patent
Vaknin et al.

(10) Patent No.: US 11,036,652 B2
(45) Date of Patent: Jun. 15, 2021

(54) SECURED ACCESS CONTROL IN A STORAGE SYSTEM

(71) Applicant: THE SILK TECHNOLOGIES ILC LTD, Yokne'am Ilit (IL)

(72) Inventors: Yogev Vaknin, Nesher (IL); Gilad Hitron, Haifa (IL); Eyal Gordon, Haifa (IL); Eran Mann, Yoqneam (IL)

(73) Assignee: THE SILK TECHNOLOGIES ILC LTD, Yokne'am Ilit (IL)

( * ) Notice: Subject to any disclaimer, the term of this patent is extended or adjusted under 35 U.S.C. 154(b) by 242 days.

(21) Appl. No.: 16/120,631

(22) Filed: Sep. 4, 2018

(65) Prior Publication Data

US 2019/0073318 A1 Mar. 7, 2019

Related U.S. Application Data

(60) Provisional application No. 62/553,965, filed on Sep. 4, 2017.

(51) Int. Cl.
*G06F 12/14* (2006.01)
*G06F 3/06* (2006.01)

(52) U.S. Cl.
CPC .......... *G06F 12/1408* (2013.01); *G06F 3/064* (2013.01); *G06F 3/067* (2013.01); *G06F 3/0622* (2013.01); *G06F 3/0623* (2013.01); *G06F 3/0673* (2013.01); *G06F 3/0689* (2013.01); *G06F 2212/1052* (2013.01)

(58) Field of Classification Search
CPC .. G06F 12/1408; G06F 3/0623; G06F 3/0689; G06F 3/067; G06F 3/0622; G06F 3/064; G06F 3/0673; G06F 2212/1052; G06F 12/1441
See application file for complete search history.

(56) References Cited

U.S. PATENT DOCUMENTS

| | | | |
|---|---|---|---|
| 8,627,038 B2* | 1/2014 | Seki | G06F 3/0689 |
| | | | 711/170 |
| 2007/0083759 A1* | 4/2007 | Drew | H04L 9/0866 |
| | | | 713/168 |
| 2009/0125678 A1 | 5/2009 | Tokuda | |
| 2010/0031056 A1 | 2/2010 | Harada | |
| 2010/0250867 A1* | 9/2010 | Bettger | G06F 16/176 |
| | | | 711/152 |
| 2013/0318362 A1* | 11/2013 | Mothilal | H04L 9/0618 |
| | | | 713/193 |

* cited by examiner

*Primary Examiner* — Mohammed Waliullah
(74) *Attorney, Agent, or Firm* — Wiggin and Dana LLP; Gregory S. Rosenblatt; Thomas M. Landman

(57) ABSTRACT

The presently disclosed subject matter includes various inventive aspects, which are directed to direct access of a host computer device to a share storage space in a storage system, as well as secured access control of the direct access of the host computer device by a control computer device in the storage system, the direct access including direct read access and direct write access.

25 Claims, 6 Drawing Sheets

Controlling, by a control computer device, a direct write process of a host computer device (500)

Receiving a direct write metadata request from the host computer device, the direct write metadata request indicative of at least one logical volume (502)

Responsive to the direct write metadata request, transmitting metadata to the host computer device, the metadata including a base key assigned to the at least one logical volume and vacant physical location on the shared physical storage space (504)

FIG. 5

Writing, by a host computer device, target data directly to a shared physical storage space (600)

Sending a direct write metadata request to the control computer device, the direct write metadata request indicative of at least one logical volume (602)

Receiving, from the control computer device, metadata including a base key assigned to the at least one logical volume and vacant physical location on the shared physical storage space (604)

Calculating respective encryption keys for encrypting the target data corresponding to one or more logical data blocks of the at least one logical volume (606)

Encrypting the target data corresponding to the one or more logical data blocks using the respective encryption keys (608)

Writing the encrypted target data to the vacant physical location (610)

Sending the control computer device a notification of completion of the direct write process (612)

FIG. 6

SECURED ACCESS CONTROL IN A STORAGE SYSTEM

FIELD OF THE PRESENTLY DISCLOSED SUBJECT MATTER

The presently disclosed subject matter is related to the field of computer storage systems and to the implementation of secured access control in a computer storage system.

BACKGROUND

In existing storage systems with multiple storage controllers, at any given time, for every logical block address served by the system, there exist one or more controllers responsible for controlling access and managing writes to that address.

Hosts write data to the system via the storage controllers. The controllers control read and write access to the data. Logical data locations may reside in different physical locations within a shared storage space in the system. The controllers decide on the placement of data within the shared storage space, and maintain mapping information between logical addresses and physical addresses.

GENERAL DESCRIPTION

The presently disclosed subject matter includes methods and systems enabling direct access of a host computer device to a shared physical storage space and access control of the direct access in a computer storage system.

According to one aspect of the presently disclosed subject matter there is provided a storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:

control a direct read process of a host computer device of the one or more host computer devices to directly read target data from the shared physical storage space, comprising:

responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least a physical location of the target data on the shared physical storage space and key metadata to be used for decryption of the target data;

thereby enabling the host computer device to read the target data from the physical location and decrypt the target data using the key metadata.

In addition to the above features, the storage system according to this aspect of the presently disclosed subject matter can optionally comprise one or more of features (i) to (viii) below, in any technically possible combination or permutation.

i. The storage system can further comprise the one or more host computer devices, wherein the host computer device can be configured to:

send the direct read request to the control computer device;

receive, from the control computer device, the metadata pertaining to the one or more logical data blocks;

read the target data from the physical location; and decrypt the target data using the key metadata.

ii. The control computer device can be further configured to calculate respective decryption keys pertaining to the one or more logical data blocks using a key derivation scheme related to a base key, the base key assigned to the at least one logical volume, and the key metadata including the respective decryption keys.

iii. The key metadata can include a base key assigned to the at least one logical volume, and the enabling can further comprise: enabling the host computer device to calculate respective decryption keys pertaining to the one or more logical data blocks using a key derivation scheme related to the base key.

iv. The key derivation scheme can include a one-way function of the base key, ID of the at least one logical volume, and Logical Block Address (LBA) of a respective logical data block.

v. The metadata can further include write generation of the target data, and wherein the key derivation scheme includes a one-way function of the base key, ID of the at least one logical volume, Logical Block Address (LBA) of a respective logical data block and the write generation of the target data.

vi. The one-way function can be a cryptographic hash function.

vii. The key metadata can include a base key assigned to the at least one logical volume, and the host computer device can be further configured to calculate respective decryption keys pertaining to the one or more logical data blocks using a key derivation scheme related to the base key, the base key assigned to the at least one logical volume.

viii. The target data can be compressed, and the host computer device can be further configured to decompress the target data.

According to another aspect of the presently disclosed subject matter there is provided a computerized method of secured access control to a shared physical storage space in a storage system, the storage system comprising one or more control computer devices operatively connected to the shared physical storage space and to one or more host computer devices, each control computer device being assigned with access control to a respective storage area in the shared physical storage space, the method comprising:

controlling, by a control computer device of the one or more control computer devices, a direct read process of a host computer device of the one or more host computer devices to directly read target data from the shared physical storage space, comprising:

responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;

thereby enabling the host computer device to read the target data from the physical location and decrypt the target data using the key metadata.

According to another aspect of the presently disclosed subject matter there is provided a computerized method of direct reading of a host computer device from a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct read request to a control computer device of the one or more control computer devices, the direct read request indicative of target data corresponding to one or more logical data blocks of at least one logical volume accessible to the host computer device and being encrypted with respective encryption keys assigned to the one or more logical data blocks;

receiving, from the control computer device, metadata pertaining to the one or more logical data blocks, wherein the metadata includes at least physical location of the target data on the shared physical storage space and key metadata to be used for decryption of the target data;

reading the target data from the physical location; and decrypting the target data using the key metadata.

According to another aspect of the presently disclosed subject matter there is provided a non-transitory computer readable storage medium tangibly embodying a program of instructions that, when executed by a computer, causing the computer to perform a method of controlling direct read access of a host computer device to a shared physical storage space by a control computer device in a storage system, the storage system comprising one or more control computer devices operatively connected to the shared physical storage space and to one or more host computer devices, each control computer device being assigned with access control to a respective storage area in the shared physical storage space, the method comprising:

responsive to a direct read request from the host computer device to directly read target data from the shared physical storage space, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;

thereby enabling the host computer device to read the target data from the physical location and decrypt the target data using the key metadata.

According to another aspect of the presently disclosed subject matter there is provided a non-transitory computer readable storage medium tangibly embodying a program of instructions that, when executed by a computer, cause the computer to perform a method of direct reading of a host computer device from a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct read request to a control computer device of the one or more control computer devices, the direct read request indicative of target data corresponding to one or more logical data blocks of at least one logical volume accessible to the host computer device and being encrypted with respective encryption keys assigned to the one or more logical data blocks;

receiving, from the control computer device, metadata pertaining to the one or more logical data blocks, wherein the metadata includes at least physical location of the target data on the shared physical storage space and key metadata to be used for decryption of the target data;

reading the target data from the physical location; and decrypting the target data using the key metadata.

The computerized methods, and the non-transitory computer readable storage medium disclosed herein according to various aspects of direct read access, can optionally further comprise one or more of features (i) to (viii) listed above, mutatis mutandis, in any technically possible combination or permutation.

According to another aspect of the presently disclosed subject matter there is provided a storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:

control a direct write process of a host computer device of the one or more host computer devices to directly write target data to the shared physical storage space, comprising:

responsive to a direct write metadata request from the host computer device, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;

thereby enabling the host computer device to:

calculate respective encryption keys for encrypting the target data corresponding to one or more logical data blocks of the at least one logical volume using a key derivation scheme related to the base key;

encrypt the target data corresponding to the one or more logical data blocks using the respective encryption keys;

write the encrypted target data to the vacant physical location; and send the control computer device a notification of completion of the direct write process.

In addition to the above features, the storage system according to this aspect of the presently disclosed subject matter can optionally comprise one or more of features (a) to (h) below, in any technically possible combination or permutation.

a. The storage system can further comprise the one or more host computer devices, and the host computer device can be configured to:

send the direct write metadata request to the control computer device; and receive, from the control computer device, the metadata pertaining to the at least one logical volume.

b. The host computer device can be further configured to:

calculate respective encryption keys for encrypting the target data corresponding to the one or more logical data blocks using a key derivation scheme related to the base key;

encrypt the target data corresponding to the one or more logical data blocks using the respective encryption keys;

write the encrypted target data to the vacant physical location; and send the control computer device a notification of completion of the direct write process.

c. The control computer device can be further configured to: responsive to the notification from the host computer device, harden the encrypted target data and acknowledge the direct write process.

d. The control computer device can be further configured to: calculate respective decryption keys for decrypting the encrypted target data corresponding to the one or more logical data blocks using the key derivation scheme related to the base key, and decrypt the encrypted target data using the respective decryption keys.

e. The key derivation scheme can include a one-way function of the base key, ID of the at least one logical volume, and Logical Block Address (LBA) of a respective logical data block.

f. The key derivation scheme can include a one-way function of the base key, ID of the at least one logical volume, Logical Block Address (LBA) of a respective logical data block, and write generation of the target data.

g. The one-way function can be a cryptographic hash function.

h. The host computer device can be further configured to compress the target data.

According to another aspect of the presently disclosed subject matter there is provided a computerized method of secured access control to a shared physical storage space in a storage system, the storage system comprising one or more control computer devices operatively connected to the shared physical storage space and to one or more host computer devices, each control computer device being assigned with access control to a respective storage area in the shared physical storage space, the method comprising:

controlling, by a control computer device of the one or more control computer devices, a direct write process of a host computer device of the one or more host computer devices to directly write target data to the shared physical storage space, comprising:

responsive to a direct write metadata request from the host computer device, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;

thereby enabling the host computer device to:

calculate respective encryption keys for encrypting the target data corresponding to one or more logical data blocks of the at least one logical volume using a key derivation scheme related to the base key;

encrypt the target data corresponding to the one or more logical data blocks using the respective encryption keys;

write the encrypted target data to the vacant physical location; and send the control computer device a notification of completion of the direct write process.

According to another aspect of the presently disclosed subject matter there is provided a computerized method of a method of direct writing of a host computer device to a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct write metadata request to a control computer device of the one or more control computer devices, the direct write metadata request indicative of at least one logical volume accessible to the host computer device;

receiving, from the control computer device, metadata pertaining to the at least one logical volume, wherein the metadata includes a base key assigned to the at least one logical volume and vacant physical location on the shared physical storage space to be used by the host computer device for writing the target data;

calculating respective encryption keys for encrypting target data corresponding to one or more logical data blocks of the at least one logical volume using a key derivation scheme related to the base key;

encrypting the target data corresponding to the one or more logical data blocks using the respective encryption keys;

writing the encrypted target data to the vacant physical location; and sending the control computer device a notification of completion of the direct write process.

According to another aspect of the presently disclosed subject matter there is provided a non-transitory computer readable storage medium tangibly embodying a program of instructions that, when executed by a computer, cause the computer to perform a method of controlling direct write access of a host computer device to a shared physical storage space by a control computer device in a storage system, the storage system comprising one or more control computer devices operatively connected to the shared physical storage space and to one or more host computer devices, each control computer device being assigned with access control to a respective storage area in the shared physical storage space, the method comprising:

responsive to a direct write metadata request from the host computer device to directly write target data to the shared physical storage space, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;

thereby enabling the host computer device to:

calculate respective encryption keys for encrypting the target data corresponding to one or more logical data blocks of the at least one logical volume using a key derivation scheme related to the base key;

encrypt the target data corresponding to the one or more logical data blocks using the respective encryption keys;

write the encrypted target data to the vacant physical location; and send the control computer device a notification of completion of the direct write process.

According to another aspect of the presently disclosed subject matter there is provided a non-transitory computer readable storage medium tangibly embodying a program of instructions that, when executed by a computer, cause the computer to perform a method of direct writing of a host computer device to a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct write metadata request to a control computer device of the one or more control computer devices, the direct write metadata request indicative of at least one logical volume accessible to the host computer device;

receiving, from the control computer device, metadata pertaining to the at least one logical volume, wherein the metadata includes a base key assigned to the at least one logical volume and vacant physical location on the shared physical storage space to be used by the host computer device for writing the target data;

calculating respective encryption keys for encrypting target data corresponding to one or more logical data blocks of the at least one logical volume using a key derivation scheme related to the base key;

encrypting the target data corresponding to the one or more logical data blocks using the respective encryption keys;

writing the encrypted target data to the vacant physical location; and sending the control computer device a notification of completion of the direct write process.

The computerized methods, and the non-transitory computer readable storage medium disclosed herein according to various aspects of direct write access, can optionally further comprise one or more of features (a) to (h) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 5 is a generalized flowchart showing a sequence of operations performed for controlling a direct write access of a host computer device to the shared physical storage space, according to some examples of the presently disclosed subject matter; and FIG. 6 is a generalized flowchart showing a sequence of operations performed in a direct write access of a host computer device to the shared physical storage space in a distributed storage system, according to some examples of the presently disclosed subject matter.

DETAILED DESCRIPTION

Figure 1:
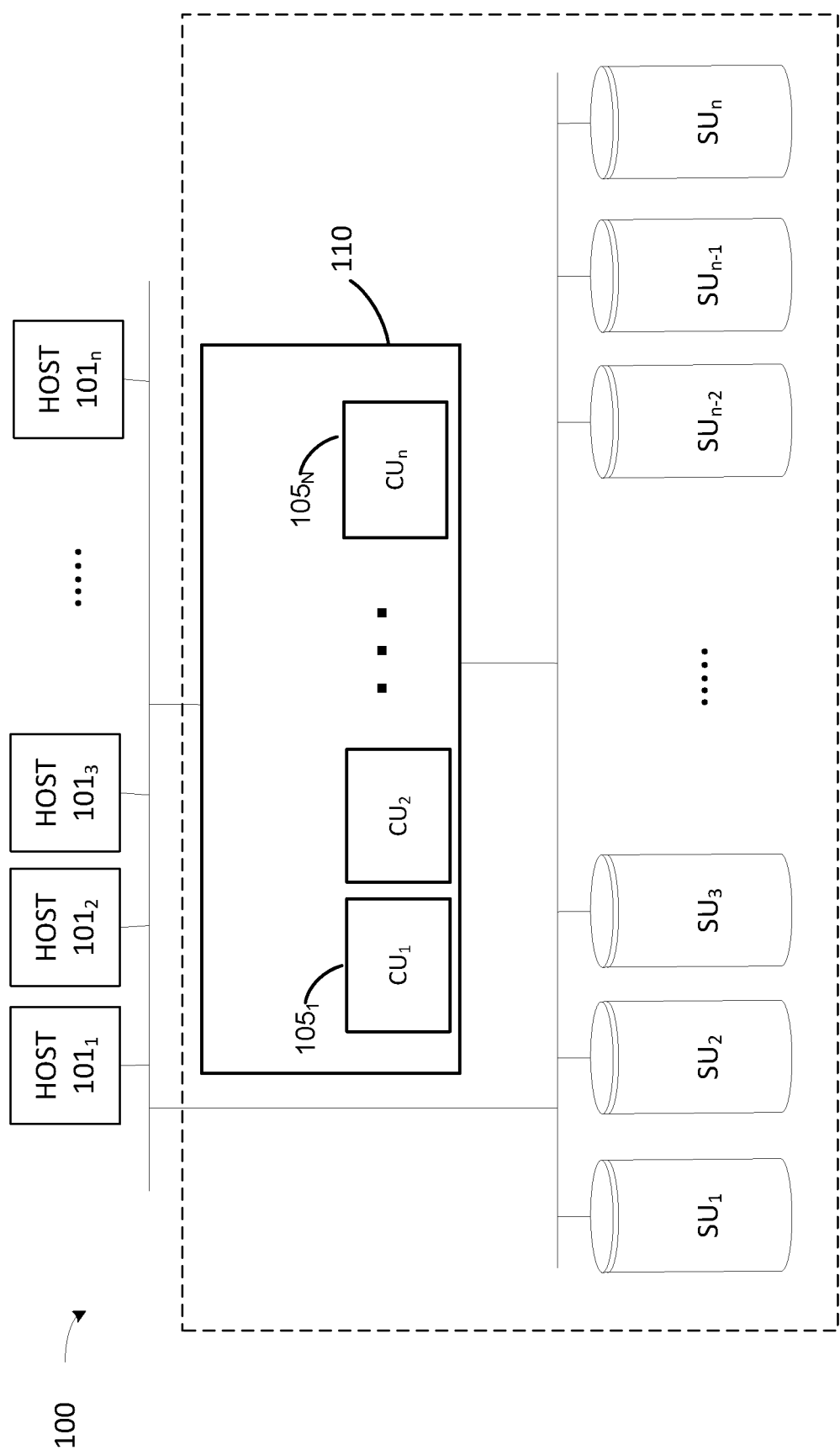
FIG. 1 is a schematic block diagram illustration of a computer storage system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "controlling", "reading", "writing", "transmitting", "enabling", "sending", "receiving", "encrypting", "decrypting", "calculating", "compressing", "decompressing", or the like, include actions and/or processes of a computer that manipulate and/or transform data into other data, said data represented as physical quantities, e.g. such as electronic quantities, and/or said data representing the physical objects.

The terms "computer", "computer device", "control unit", "server" or the like as disclosed herein should be broadly construed to include any kind of electronic device with data processing circuitry, which includes a computer processing device configured and operable to execute computer instructions stored, for example, on a computer memory being operatively connected thereto. Examples of such a device include: a digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIG. 3 to FIG. 6 may be executed. In embodiments of the presently disclosed subject matter, one or more stages illustrated in FIG. 3 to FIG. 6 may be executed in a different order and/or one or more groups of stages may be executed simultaneously.

FIG. 1 to FIGS. 2A and 2B illustrate various aspects of the system architecture in accordance with some examples of the presently disclosed subject matter. Elements in FIG. 1 to FIGS. 2A and 2B can be made up of a combination of software and hardware and/or firmware that performs the functions as defined and explained herein. Elements in FIG. 1 to FIGS. 2A and 2B may be centralized in one location or dispersed over more than one location. In other examples of the presently disclosed subject matter, the system may comprise fewer, more, and/or different elements than those shown in FIG. 1 to FIGS. 2A and 2B. For example, some components of control unit 105 can be implemented as a separate unit in interface layer 110 or implemented on an external server or be otherwise operatively connected to the storage system for enabling management of I/O operations.

Throughout the description and the claims, reference is made to the term "logical unit" (or "LU" in abbreviation, also known as "volume" or "logical volume"). The term logical unit is known in the art of computer storage, and the following definition is provided as a non-limiting example only for convenience purposes. Storage systems are often logically divided into logical units (LUs) to obtain a partitioned storage where each LU can be presented and accessed as a separate device. Each logical unit is identified by a respect logical unit number (LUN). For example, according to the small system computer interface (SCSI) standard, a SCSI initiator in a host originates an I/O command sequence that is transmitted to a SCSI target endpoint or recipient storage device. A logical unit is an entity within the SCSI target that responds to the SCSI I/O command.

The term "logical block address" (LBA) or "logical address" (LA) as used herein, relates to the basic reference unit which is used by external hosts to address I/O requests to the storage system. LBAs can be numerical and range from 1-n. A partly or an entirely overlapping LBA range (e.g., 1-n) can be used with multiple, different LUs (e.g., all the LUs) in the storage system, and therefore in order to reference a specific logical block, a reference to the LU with which the logical block is associated may be required. For simplicity, in some examples in the description the I/O requests may reference LBA, and the existence of multiple LUs in the storage system is not mentioned. It would be appreciated that this omission is made with the intention of simplifying the description of the examples of the presently disclosed subject matter, and is not intended to limit the scope of the description. Therefore, it would be appreciated that examples of the presently disclosed subject matter contemplate a multi-LU storage system and that the LBAs which are referred to herein can be comprised of a combination of an LBA and a LU ID (e.g., LU number).

Bearing the above in mind, attention is drawn to FIG. 1, which is a schematic block diagram of a computer storage system, according to some examples of the presently disclosed subject matter. Storage system 100 (e.g. a distributed data-storage system) includes a physical storage space comprising one or more physical storage units ($SU_{1-n}$), each physical storage unit comprising one or more storage devices. Storage devices may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network. It is to be noted that the storage system described herein refers to a block storage system where data is stored in blocks and can be accessed by their block address.

Storage system 100 can further comprise an interface layer 110 comprising one or more control units (also referred to herein as control computer devices) $105_{1-n}$ operatively connected to the shared physical storage space and to one or more hosts (also referred to herein as host computer devices) $101_{1-n}$, and configured to control and execute various operations in the storage system (including, e.g., input and/or output (I/O) operations). Various examples of control units are described in more detail below.

Interface layer 110 can be further configured to provide a virtual storage layer logically representing the physical storage space as well as the required mapping between the physical storage space and its respective logical representation. Different control units $105_{1-n}$ in the interface layer 110 (where a control unit is implemented, in some examples, by a dedicated computer device, e.g., a dedicated computer server device) can be assigned for managing the operation of a certain area within the physical storage space (e.g. an area comprising, for example, one or more designated physical storage units or part thereof).

According to certain embodiments of the presently disclosed subject matter, the Interface layer 110 can be further configured to control direct access (e.g., direct read and direct write) of hosts $101_{1-n}$ to the shared physical storage space, as described in detail below with reference to FIGS. 2A and 2B.

Communication between hosts $101_{1-n}$ and interface layer 110, between interface layer 110 and storage units $SU_{1-n}$, between hosts $101_{1-n}$ and storage units $SU_{1-n}$, and within interface layer 110 (e.g., between different control unit $105_{1-n}$) can be realized by any suitable infrastructure and protocol. Hosts ($101_{1-n}$) can be connected to the interface layer 110 and/or storage units $SU_{1-n}$ directly or through a network (e.g. over the Internet). According to one example, communication between various elements of storage system 100 is implemented with a combination of Fiber Channel (e.g. between hosts and interface layer 110), SCSI (e.g. between interface 110 and storage units) and InfiniBand (e.g. interconnecting different control units in interface 110) communication protocols.

Figure 2A:
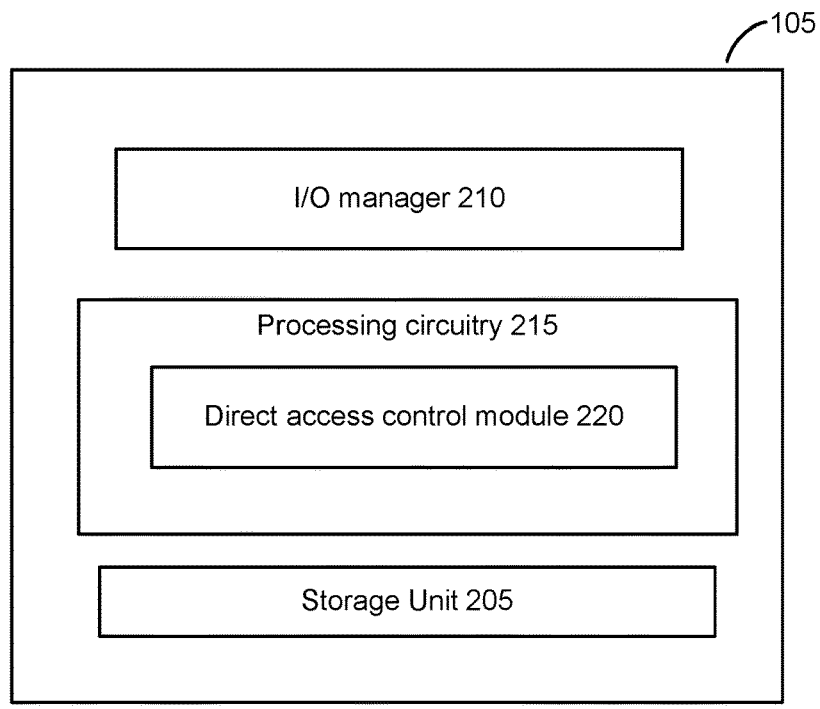
FIG. 2A is a schematic block diagram showing some components of a control unit according to some examples of the presently disclosed subject matter.

FIG. 2A is a schematic block diagram showing some components of a control unit according to some examples of the presently disclosed subject matter. Control unit 105 can be implemented on a computer device comprising a processing circuitry 215. The processing circuitry 215 is configured to provide all processing necessary for the control unit to function as further detailed below with reference to FIGS. 3 and 5. The processing circuitry 215 comprises or is otherwise operatively connected to one or more computer processors (not shown separately) and memory (not shown separately). The processor(s) of processing circuitry 215 can be configured to execute one or more functional modules in accordance with computer-readable instructions implemented on a non-transitory computer-readable memory comprised in the processing circuitry. Such functional module(s) are referred to hereinafter as comprised in the processing circuitry.

The control unit 105 can further comprise, by way of example, an I/O manager 210 configured to handle I/O requests and metadata/data request received, for example, from host computer devices 101$_{1-n}$, and a storage unit 205 configured to store data and/or metadata, configurations and/or logic which are used by the I/O manager 210 and the processing circuitry 215. According to some examples of the presently disclosed subject matter, the processing circuitry 215, the storage unit 205, and I/O manager 210 can be operatively connected to each other.

According to some embodiments, functional module(s) comprised in the processing circuitry can include a Direct Access Control module 220 configured to control direct access of a host computer device to the shared physical storage space in a distributed storage system as described below with reference to FIG. 3 and FIG. 5. In one embodiment, the Direct Access Control module 220 is configured to control a secured/cryptographic access of the host computer device to the shared physical storage space, as will be detailed below.

According to some embodiments, I/O manager 210 can be implemented as one or more components distributed over more than one control unit. According to some examples, each control unit can comprise a respective I/O manager 210, while according to other examples, one I/O manager may be accessible and operable by more than one control unit. According to some examples, some components of control unit 105 can be implemented as a separate unit in interface layer 110 or implemented on an external server, or be otherwise operatively connected to the storage system for enabling management of I/O operations. For example, the Direct Access Control module 220 can be implemented as a separate unit operatively connected to I/O manager 210.

As mentioned above, the presently disclosed subject matter contemplates a distributed storage system with an interface layer 110 configured with multiple control units (105$_1$ to 105$_n$ as indicated in FIG. 1). As would be apparent to any person skilled in the art, principles described with respect to a single control unit herein can likewise apply to two or more control units in system 100.

According to some embodiments of the presently disclosed subject matter, host computer devices can be configured to read and/or write data with respect to the shared physical storage space via the control units (i.e., indirect access). In such cases, control units 101$_{1-n}$ can be adapted to read data and/or metadata from the storage space (SU$_{1-n}$), and/or write data and/or metadata to the storage space (SU$_{1-n}$). According to examples of the presently disclosed subject matter, the logical address space of the storage system 100 is logically partitioned so that for every logical address, there is at least one control unit which is responsible for that logical address (e.g., the data stored thereon) and assigned for handling read and write requests directed to that address.

Further by way of example, control units can hold translation tables or implement translation functions which map from the logical address to the physical storage space. In some examples (e.g. for the purpose of redundancy and/or efficiency), two or more control units can be assigned to handle I/O requests to the same physical storage area. In some examples, there are at least two control units that are each assigned to handle I/O requests to respective non-overlapping storage areas, such that one control unit cannot access the storage area assigned to the other control unit, and vice versa. In such cases, only a single control unit of the at least two control units is assigned with access to a given physical storage area. In other words, there is at least one control unit assigned with access control and write permission to a respective physical storage area which is not accessible to at least one other control unit.

In response to receiving an I/O request, the control unit can be configured to determine with which address (LU, LBA) the I/O request is associated. The control unit can use address mapping tables (or mapping functions) to determine, based on the logical address referenced in the I/O request, to which storage location in the physical storage to address the I/O request.

According to some embodiments of the presently disclosed subject matter, in order to gain performance, it is desired to enable direct access of hosts to the shared physical storage space, e.g., to enable them to read data directly from the shared storage space, and/or write data directly to the shared storage space, after initially consulting the control units for metadata pertaining to a certain logical address. In such cases, control units 101$_{1-n}$, in particular, the Direct Access Control module 220 thereof, can be adapted to, in response to a direct access request from the host computer device, transmit relevant metadata to the host computer device, thereby enabling the host computer device to directly access the physical location.

In certain embodiments, in order to maintain data confidentiality, it may be required to enable the hosts to access only the data they are allowed to access, or write only to accessible locations—e.g. a specific set of volumes per host. This in some cases may contradict the desire to enable direct access of the hosts to the shared storage space. One possible cause for this is since data may be compressed during a write flow, the data may reside on part of actual physical storage block(s), even though it was originally comprised in one or more full logical data blocks. Thus in some cases a physical storage block may contain data from several logical data blocks, which may belong to different hosts.

In order to enable granular access control while still enabling the hosts to directly access the shared physical storage space, the control units 101$_{1-n}$, in particular, the Direct Access Control module 220 thereof, can be configured to control a secured/cryptographic access of the hosts to a shared storage space in accordance with certain embodiments of the presently disclosed subject matter. In certain embodiments, secured access control can be enabled by using a data encryption algorithm with a granular key derivation scheme, which results in data corresponding to different logical blocks being encrypted with different encryption keys, as will be described in further detail with reference to FIGS. 3-6. Information or metadata related to the keys are controlled by the control units and can be transmitted to the hosts upon receiving requests therefrom, thereby enabling secured and granular access control of the hosts, e.g., the hosts can only access what they are allowed to access.

By way of example, direct access of the hosts can include direct read and/or direct write access to the shared storage space. In the case of direct read access control of a host to directly read target data from the shared storage space where the target data corresponds to one or more logical data blocks of at least one logical volume accessible to the host and are encrypted with respective encryption keys assigned to the one or more logical data blocks, the Direct Access Control module 220 can be configured to, responsive to a direct read request from the host computer device, transmit metadata pertaining to the one or more logical data blocks to the host. The metadata includes at least physical location of the target data on the shared physical storage space and key metadata to be used for decryption of the target data. This enables the host to read the target data from the physical location and decrypt the target data using the key metadata, as will be described in further detail with reference to FIG. 3.

In the case of direct write access control of a host to directly write target data to the shared physical storage space, the Direct Access Control module 220 can be configured to, responsive to a direct write metadata request from the host computer device where the direct write metadata request is indicative of at least one logical volume accessible to the host computer device, transmit metadata pertaining to the at least one logical volume to the host computer device. The metadata can include a base key assigned to the at least one logical volume and vacant physical location on the shared physical storage space to be used by the host computer device for writing the target data. This enables the host to perform the direct write process, as will be described in further detail with reference to FIG. 5.

Figure 2B:
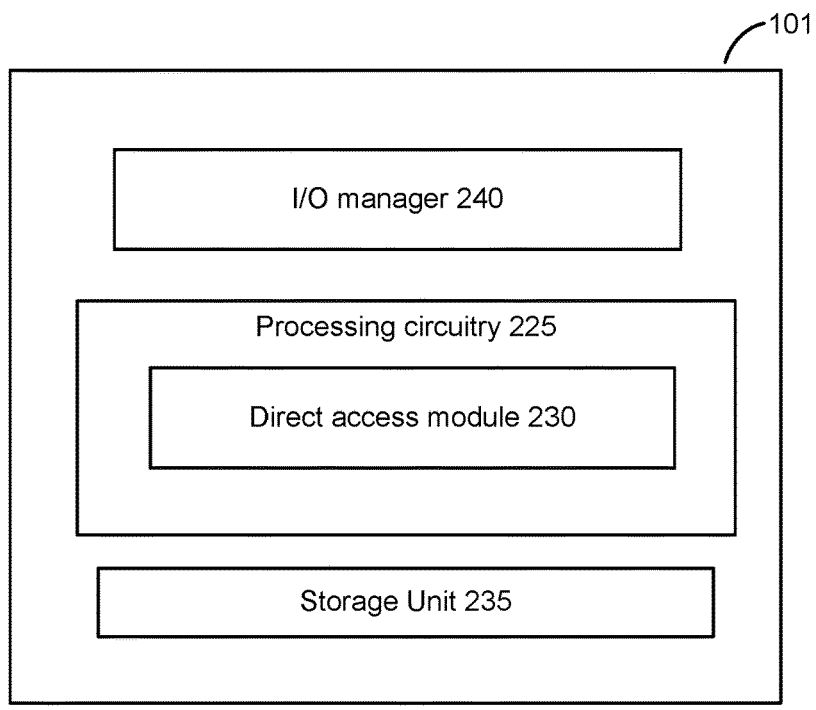
FIG. 2B is a schematic block diagram showing some components of a host computer device according to some examples of the presently disclosed subject matter.

Turning now to FIG. 2B, there is illustrated a schematic block diagram showing some components of a host computer device according to some examples of the presently disclosed subject matter. A host 101 can be implemented on a computer device comprising a processing circuitry 225. The processing circuitry 225 is configured to provide all processing necessary for the host to function as further detailed below with reference to FIGS. 4 and 6. The processing circuitry 225 comprises or is otherwise operatively connected to one or more computer processors (not shown separately) and memory (not shown separately). The processor(s) of processing circuitry 225 can be configured to execute one or more functional modules in accordance with computer-readable instructions implemented on a non-transitory computer-readable memory comprised in the processing circuitry. Such functional module(s) are referred to hereinafter as comprised in the processing circuitry.

The host 101 can further comprise, by way of example, an I/O manager 240 configured to send I/O requests and/or data/metadata requests, for example, to control units $105_{1-n}$ as well as send and/or receive data with respect to the physical storage space. The host 101 can further comprise a storage unit 235 configured to store data and/or metadata, and configurations and/or logic which are used by the I/O manager 240 and the processing circuitry 225. According to some examples of the presently disclosed subject matter, the processing circuitry 225, the storage unit 235, and I/O manager 240 can be operatively connected to each other.

According to some embodiments, functional module(s) comprised in the processing circuitry can include a Direct Access module 230 configured to directly access the shared physical storage space in a distributed storage system as described below with reference to FIG. 4 and FIG. 6.

As mentioned above, the presently disclosed subject matter contemplates a distributed storage system with an interface layer 110 configured with multiple control units ($105_1$ to $105_n$ as indicated in FIG. 1). One or more host computer devices 101 can be operatively connected to the interface layer. In certain embodiments, the distributed storage system can comprise the one or more host computer devices. As would be apparent to any person skilled in the art, principles described with respect to a single host computer device herein can likewise apply to two or more host computer devices.

According to some embodiments of the presently disclosed subject matter, host computer devices can be configured to read and/or write data with respect to the shared physical storage space via the control units (i.e., indirect access). According to further embodiments of the presently disclosed subject matter, in order to gain performance, host computer devices can be configured to directly read and/or write target data with respect to the shared physical storage space, in addition to or in lieu of the indirect access. As controlled by the control units 105, the hosts can be configured to access only the data they are allowed to access, or write only to accessible locations for the purpose of maintaining data confidentiality.

As aforementioned, direct access of the hosts can include direct read and/or direct write access to the shared storage space. In the case of direct read access of a host to directly read target data from the shared storage space where the target data corresponds to one or more logical data blocks of at least one logical volume accessible to the host and are encrypted with respective encryption keys assigned to the one or more logical data blocks, the Direct Access module 230 can be configured to send the direct read request to the control computer device, receive, from the control computer device, the metadata pertaining to the one or more logical data blocks, read the target data from the physical location, and decrypt the target data using the key metadata, as will be described in further detail with reference to FIG. 4.

In the case of direct write access control of a host to directly write target data to the shared physical storage space, the Direct Access module 230 can be configured to calculate respective encryption keys for encrypting the target data corresponding to the one or more logical data blocks of the at least one logical volume using a key derivation scheme related to the base key, encrypt the target data corresponding to the one or more logical data blocks using the respective encryption keys, write the encrypted logical data blocks target data to the vacant physical location, and send the control computer device a notification of completion of the direct write process, as will be described in further detail with reference to FIG. 6.

Having provided a high level description of the various components of the storage system, more details are now provided with respect to operation of the storage system.

Figure 3:
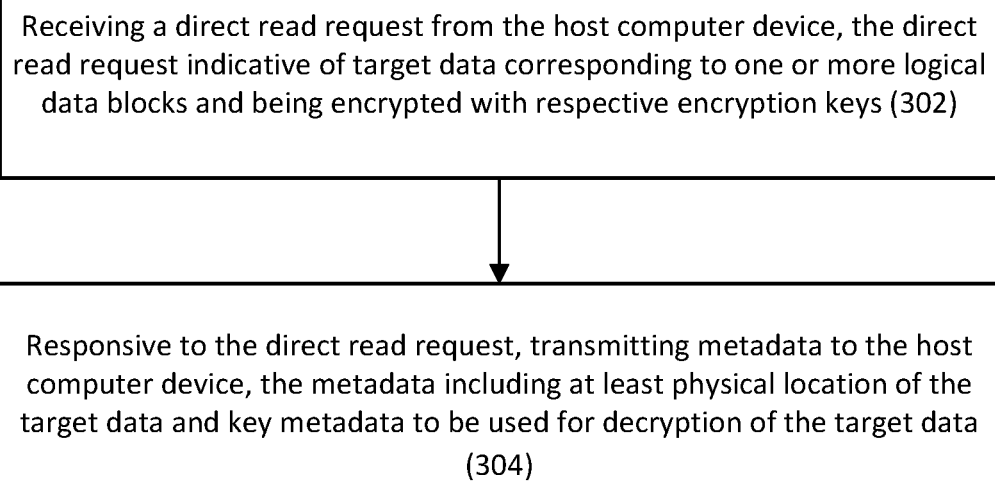
FIG. 3 is a generalized flowchart showing a sequence of operations performed for controlling a direct read access of a host computer device to the shared physical storage space in a distributed storage system, according to some examples of the presently disclosed subject matter.

FIG. 3 is a generalized flowchart showing a sequence of operations performed for controlling a direct read access of a host computer device to the shared physical storage space in a distributed storage system, according to some examples of the presently disclosed subject matter.

Operations described with reference to FIG. 3 can be executed for example, by interface layer 110 and more specifically by one or more of the control units 105 described above. It should be appreciated, that while some operations are described with reference to system 100 and control computer device 105 and components thereof presented above, this is done by way of example only, and this should not be construed to limit the operations to being implemented on such components alone.

As described above, the distributed storage system described herein comprises one or more control units (also referred to herein as control computer devices). The one or more control computer devices can be operatively connected to a shared physical storage space of the storage system which is operable by the control computer devices and to one or more host computer devices. The shared physical storage space can comprise one or more storage devices. Each control computer device can be assigned with access control and write permission to a respective physical storage area in the storage system. Since the logical address space of the storage system is logically partitioned, for each given logical address, there is at least one control computer device which is responsible for that address (e.g., the data stored thereon) and assigned for handling I/O requests (e.g., read and write requests) directed to that address. Each host computer device has direct access to one or more logical volumes in the storage system.

A direct read process of a host computer device of the one or more host computer devices can be controlled (300) by a control computer device (e.g., by the Direct Access Control module 220 of a control unit 105 as illustrated in FIG. 2A) to directly read target data from the shared physical storage space. Control of the direct read process can comprise operations as described below.

A direct read request from the host computer device can be received (302) by the control computer device (e.g., by the Direct Access Control module 220). The direct read request is indicative of the target data to be read by the host computer device. The target data corresponds to one or more logical data blocks of at least one logical volume accessible to the host computer device. In accordance with a data encryption scheme using a key derivation algorithm as will be described in detail below, each logical block can be assigned with a respective encryption key. Thus data which corresponds to different logical data blocks can be encrypted with respective encryption keys assigned thereto.

In response to receiving the direct read request, metadata pertaining to the one or more logical data blocks can be transmitted (304) by the control computer device (e.g., by the Direct Access Control module 220) to the host computer device. The metadata includes at least physical location of the target data on the shared physical storage space and key metadata to be used for decryption of the target data. The control computer device that receives the request and transmits the metadata can be assigned with access control to the one or more logical data blocks such that it can provide the metadata needed to the host computer device. In some cases, the read request can be received by a different control computer device which does not have access control to the one or more logical data blocks. In such cases, the different control computer device can transfer the read request to the right controller for further processing. Transmission of the metadata can enable the host computer device to read the target data from the physical location and decrypt the target data using the key metadata, as will be described in further detail with reference to FIG. 4.

As aforementioned, a data encryption/decryption algorithm with a key derivation scheme is used for encrypting/decrypting data corresponding to the one or more logical data blocks (also referred to herein as encrypting/decrypting the one or more logical data blocks). There is provided an example of such a key derivation algorithm/scheme as described below.

According to certain embodiments, a random base key (or more than one base key) can be assigned to each logical volume or at least one logical volume in the storage system. The encryption/decryption key of a specific logical block on a logical volume can be calculated based on the base key. By way of example, the key derivation scheme can include a deterministic one-way function of the base key, the volume ID, and the LBA of a respective logical data block. The base key information can be controlled by the control unit. Calculation of encryption/decryption keys can be performed either by the control computer device, or by the host.

Specifically, in the above described process of direct read access control with reference to FIG. 3, the key metadata included in the metadata that is transmitted from the control computer device to the host can include the base key assigned to the at least one logical volume, and the calculation of respective decryption keys pertaining to the one or more logical data blocks can be performed by the host computer device using the key derivation scheme related to the base key.

Alternatively, the respective decryption keys can be calculated by the control computer device using the key derivation scheme related to the base key. In such cases, the key metadata transmitted to the host can include the respective decryption keys. This is especially beneficial in cases where deduplication to other logical volumes is allowed on a specific volume. In such cases it is desired not to give the host full information of derived keys on volumes it does not have access to. Therefore, in order to not give the host base keys assigned to other volumes, the control computer device can calculate the respective decryption keys using the base keys and include these decryption keys in the key metadata to be transmitted to the host.

Optionally, in case that there is a write-generation of the target data, the one-way function can be further based on the write-generation. In such cases, when the respective decryption keys are calculated by the host, the metadata transmitted to the host includes also the write-generation of the target data. The term write-generation(s) is known in the field and can be used to refer to generations or versions of target data that are written into different physical locations by different write operations. For instance, the target data written in an original location can be referred to as generation 0. The target data may be further written or copied to an additional physical storage location in addition to or in lieu of the original location, which can be referred to as, e.g., generation 1. Therefore, the generation number can indicate an instance of writing the logical data block to a physical location. According to certain embodiments, the generation number should be coordinated between the host and the control computer device. For instance, the host can encrypt a logical data block using generation 0, or optionally it can maintain its own generation number and notify the control computer device of it (in which case the control computer device needs to store this generation number with the metadata).

One example of a suitable one-way function is a cryptographic hash function (e.g. SHA256). In such cases, the encryption/decryption key of a specific logical block can be calculated as follows (where the | sign designates concatenation of byte-strings):

key(*lba*=*L*,volume=*V*,generation=*G*,base-key=*B*)
=SHA256(*B*|*V*|*L*|*G*)

In some embodiments, the encryption/decryption algorithm using the derived keys to encrypt/decrypt the one or more logical data blocks can be a strong symmetric encryption/decryption algorithm (e.g. AES256). In such cases, the encryption key and decryption key pertaining to a given logical data block are the same. Alternatively, other types of encryption/decryption algorithms can also be applied when appropriate.

Figure 4:
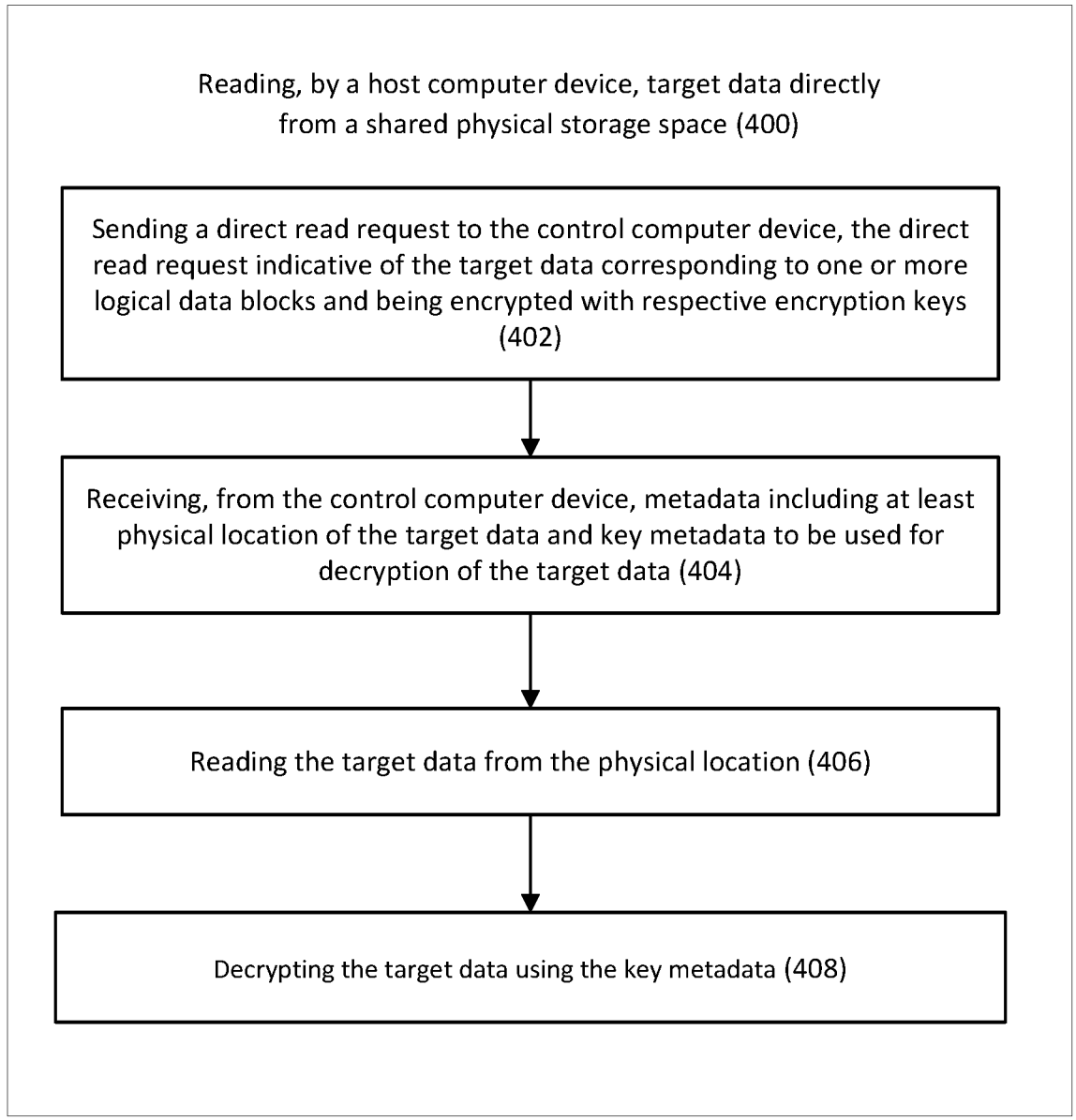
FIG. 4 is a generalized flowchart showing a sequence of operations performed in a direct read access of a host computer device to the shared physical storage space in a distributed storage system, according to some examples of the presently disclosed subject matter.

Turning now to FIG. 4, there is illustrated a generalized flowchart showing a sequence of operations performed in a direct read access of a host computer device to the shared physical storage space in a distributed storage system, according to some examples of the presently disclosed subject matter.

Operations described with reference to FIG. 4 can be executed for example, by one of the host computer devices 101 described above. It should be appreciated, that while some operations are described with reference to system 100 and host computer device 101 and components thereof presented above, this is done by way of example only, and this should not be construed to limit the operations to being implemented on such components alone.

As described above, the distributed storage system described herein comprises one or more control computer devices operatively connected to a shared physical storage space and to one or more host computer devices. Components and configurations of the distributed storage system are implemented in a similar manner as described with reference to FIG. 3 and FIG. 1, which are not repeated here for the purpose of brevity and simplicity of the description.

A direct read process is performed by a host computer device of the one or more host computer devices. Specifically, target data can be directly read (400) (e.g., by the Direct Access module 230 of a host computer device 101 as illustrated in FIG. 2B) from the shared physical storage space. The direct read process can comprise operations as described below.

When a host computer device intends to read certain target data from the shared physical storage space, a direct read request can be sent (402) by the host computer device (e.g., by the Direct Access module 230) to the interface layer 110, or a control computer device in the interface layer that is responsible for the read request. The direct read request is indicative of the target data to be read by the host computer device. The target data corresponds to one or more logical data blocks of at least one logical volume accessible to the host computer device. In accordance with the data encryption scheme and the key derivation algorithm as described above, data which corresponds to the one or more logical data blocks can be encrypted with respective encryption keys assigned thereto. The control computer device is assigned with access control to the one or more logical data blocks.

Upon the metadata transmission by the control computer device, as described with reference to block 304, the metadata pertaining to the one or more logical data blocks can be received (404) by the host computer device (e.g., by the Direct Access module 230) from the control computer device. As described above, the metadata includes at least physical location of the target data on the shared physical storage space and key metadata to be used for decryption of the target data. The target data can be read (406) by the host computer device from the physical location, and can be decrypted (408) using the key metadata. Optionally, if the target data is compressed, the target data can be further decompressed.

It is to be noted that the encryption/decryption algorithms and key derivation scheme are implemented in a similar manner as described with reference to FIG. 3, which are not repeated here for the purpose of brevity and simplicity of the description.

Having described the direct read access of the host computer device, as well as the access control thereof by the control computer device, there is now described direct write access of the host computer device, as well as access control thereof by the control computer device.

Reference is now made to FIG. 5, illustrating a generalized flowchart showing a sequence of operations performed for controlling a direct write access of a host computer device to the shared physical storage space, according to some examples of the presently disclosed subject matter.

Operations described with reference to FIG. 5 can be executed for example, by interface layer 110 and more specifically by one of the control units 105 described above. It should be appreciated, that while some operations are described with reference to system 100 and control computer device 105 and components thereof presented above, this is done by way of example only, and this should not be construed to limit the operations to being implemented on such components alone.

As described above, the distributed storage system described herein comprises one or more control computer devices operatively connected to a shared physical storage space and to one or more host computer devices. Components and configurations of the distributed storage system are implemented in a similar manner as described with reference to FIG. 3 and FIG. 1, which are not repeated here for the purpose of brevity and simplicity of the description.

A direct write process of a host computer device of the one or more host computer devices can be controlled (500) by a control computer device (e.g., by the Direct Access Control module 220 of a control unit 105 as illustrated in FIG. 2A) to directly write target data to the shared physical storage space. Control of the direct write process can comprise operations as described below.

A direct write metadata request from the host computer device can be received (502) by a control computer device (e.g., by the Direct Access Control module 220). The direct write metadata request is indicative of at least one logical volume accessible to the host computer device.

In response to receiving the direct write metadata request, metadata pertaining to the at least one logical volume can be transmitted (504) by a control computer device (e.g., by the Direct Access Control module 220) to the host computer device. The metadata includes a base key assigned to the at least one logical volume and vacant physical location on the shared physical storage space to be used by the host computer device for writing the target data. The control computer device that receives the request and transmits the metadata is assigned with access control to the at least one logical volume such that it can provide the metadata needed to the host computer device. Transmission of the metadata can enable the host computer device to perform a direct write process, including at least encrypting of the target data and writing the encrypted target data to the vacant physical location, as will be described in further detail with reference to FIG. 6.

According to certain embodiments, responsive to receiving a notification from the host computer device that the direct write process is complete, as will be described with reference to block 612 in FIG. 6, the target data (i.e., the encrypted target data) can be hardened and the direct write process can be acknowledged by the control computer device (e.g., by the Direct Access Control module 220). Hardening data is known in the art, and refers, in the present disclosure, to storing data such that the data is ready for long term storage. By way of example, the target data can be copied to an additional storage location in the storage system. In some cases, the data can be hardened to a storage location in a storage medium. The storage medium can be, e.g., a non-volatile storage medium including any one of the following: Hard Storage devices (HDD) or Solid State Drives (SSD, comprising for example, a plurality of NAND elements), DRAM, non-volatile RAM, or any other computer storage device or combination thereof.

According to certain embodiments, in some cases it is needed for the control computer device to access the actual data (i.e., the non-encrypted target data) that has been written for its own write process (e.g., in the case of data duplication). The target data that has been written by the host computer device corresponds to one or more logical data blocks which are encrypted with respective encryption keys, in a similar way as described above in the encryption algorithm and key derivation scheme with reference to FIG.

3, the description of which will not be repeated here for the purpose of brevity and simplicity of the description. Accordingly, for the purpose of accessing the actual target data, respective decryption keys can be calculated by the control computer device (e.g., by the Direct Access Control module 220) for decrypting the encrypted target data using the key derivation scheme related to the base key, and the encrypted target data can be decrypted by the control computer device using the respective decryption keys.

Turning now to FIG. 6, there is illustrated a generalized flowchart showing a sequence of operations performed in a direct write access of a host computer device to the shared physical storage space in a distributed storage system, according to some examples of the presently disclosed subject matter.

Operations described with reference to FIG. 6 can be executed for example, by one of the host computer devices 101 described above. It should be appreciated, that while some operations are described with reference to system 100 and host computer device 101 and components thereof presented above, this is done by way of example only, and this should not be construed to limit the operations to being implemented on such components alone.

As described above, the distributed storage system described herein comprises one or more control computer devices operatively connected to a shared physical storage space and to one or more host computer devices. Components and configurations of the distributed storage system are implemented in a similar manner as described with reference to FIG. 3 and FIG. 1, which are not repeated here for the purpose of brevity and simplicity of the description.

A direct write process is performed by a host computer device of the one or more host computer devices. Specifically, target data can be directly written (600) (e.g., by the Direct Access module 230 of a host computer device 101 as illustrated in FIG. 2B) to the shared physical storage space. The direct write process can comprise a sub-process of requesting metadata and a sub-process of the actual write, of which the operations are described below.

In order for a host computer device to write certain target data directly to the shared physical storage space, certain metadata needs to be requested and obtained prior to the write process. It is to be noted that requesting the metadata does not necessarily need to be performed upon the host computer device intending/requesting to write certain target data. It can be performed at any time before the actual write process. Once obtaining the necessary metadata, the actual write process can be performed directly by the host computer device at any time afterwards when the host computer device desires to do so, without further interference of the control computer device.

Accordingly, a direct write metadata request can be sent (602) by the host computer device (e.g., by the Direct Access module 230) to the interface layer 110, or to a control computer device in the interface layer that is responsible for the metadata request. The direct write metadata request is indicative of at least one logical volume accessible to the host computer device.

Upon the metadata transmission by the control computer device, as described with reference to block 504, the metadata pertaining to the at least one logical volume can be received (604) by the host computer device (e.g., by the Direct Access module 230) from the control computer device. As described above, the metadata includes a base key assigned to the at least one logical volume and vacant physical location on the shared physical storage space to be used by the host computer device for writing the target data.

The control computer device that receives the request and transmits the metadata is assigned with access control to the at least one logical volume, such that it can provide the metadata needed to the host computer device.

With the received metadata, the host computer device can perform the actual write sub-process. Specifically, respective encryption keys can be calculated (606) by the host computer device for encrypting the target data corresponding to one or more logical data blocks of the at least one logical volume using a key derivation scheme related to the base key. The target data corresponding to the one or more logical data blocks can be encrypted (608) using the respective encryption keys. The encrypted target data can be written (610) to the vacant physical location. A notification of completion of the direct write process can be sent (612) to the control computer device. Optionally, if needed, the target data can also be compressed prior to being encrypted.

Similarly, the encryption/decryption algorithms and key derivation scheme used herein are implemented in a similar manner as described with reference to FIG. 3, which are not repeated here for the purpose of brevity and simplicity of the description.

It is to be noted that the direct access (including direct read and direct write access) of the host computer device to the shared physical storage space as well as access control thereof by the control computer device, as described with reference to FIGS. 3-6, can be implemented in addition to or in lieu of the indirect access described above. The distributed storage system can be configured in different ways to enable direct and/or indirect access of at least some of the host computer devices. By way of example, certain host computer devices can be restricted to have only indirect access or direct access, while some others can have both types of access.

It is also to be noted that in some embodiments, the distributed storage system can comprise the one or more control computer devices 105 with functionalities thereof described with reference to FIGS. 3 and 5 and the shared physical storage space operatively connected thereto. In some embodiments, the distributed storage system can comprise the one or more control computer devices 105, the shared physical storage space, and the one or more host computer devices 101 with functionalities thereof described with reference to FIGS. 4 and 6.

As a comparison to direct write access of the host computer device as described with reference to FIG. 6, there is now described an example of indirect write access of a host computer device to write data to the shared physical storage space via the interface layer 110. It is to be noted that this part of description is only for the purpose of illustration and comparison without any intent to limit the present disclosure in any way.

A host computer device first writes the target data to the logical address (by sending the data to a control computer device). The control computer device receives the data, manages it through its regular write process (e.g. performs deduplication and/or compression on the data, if needed) and eventually decides to write it to the shared storage space at a certain vacant physical location. The control computer device then encrypts the data according to the encryption algorithm with the key derivation scheme described above, and writes the data to the designated physical storage location. In some cases, the host computer device may encrypt the data before sending it to the control computer device, with an encryption key known to both of them (e.g. the encryption key can be derived based on a base key as described in the key derivation scheme above), in order to protect data-in-flight confidentiality. In such cases, the control computer device may need to temporarily decrypt the data in order to perform its own write process to write the data to the physical storage location.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:
    control a direct read process of a host computer device of the one or more host computer devices to directly read target data from the shared physical storage space, comprising:
        responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;
        thereby enabling the host computer device to read the target data from the physical location and decrypt the target data using the key metadata;
    wherein the control computer device is further configured to calculate respective decryption keys pertaining to the one or more logical data blocks using a key derivation scheme related to a base key, the base key assigned to the at least one logical volume, and wherein the key metadata includes the respective decryption keys.

2. The storage system of claim 1, wherein the key derivation scheme includes a one-way function of the base key, ID of the at least one logical volume, and Logical Block Address (LBA) of a respective logical data block.

3. The storage system of claim 2, wherein the one-way function is a cryptographic hash function.

4. A storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:
    control a direct read process of a host computer device of the one or more host computer devices to directly read target data from the shared physical storage space, comprising:
        responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;
        thereby enabling the host computer device to read the target data from the physical location and decrypt the target data using the key metadata;
    wherein the key metadata includes a base key assigned to the at least one logical volume, and wherein the enabling further comprises: enabling the host computer device to calculate respective decryption keys pertaining to the one or more logical data blocks using a key derivation scheme related to the base key.

5. The storage system of claim 4, wherein the metadata further includes write generation of the target data, and wherein the key derivation scheme includes a one-way function of the base key, ID of the at least one logical volume, Logical Block Address (LBA) of a respective logical data block and the write generation of the target data.

6. A storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:
    control a direct read process of a host computer device of the one or more host computer devices to directly read target data from the shared physical storage space, comprising:
        responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;
        thereby enabling the host computer device to read the target data from the physical location and decrypt the target data using the key metadata;

wherein the storage system further comprises the one or more host computer devices, and wherein the host computer device is configured to:
send the direct read request to the control computer device;
receive, from the control computer device, the metadata pertaining to the one or more logical data blocks;
read the target data from the physical location; and
decrypt the target data using the key metadata;
wherein the target data is compressed, and wherein the host computer device is further configured to decompress the target data.

7. A storage system comprising one or more control computer devices operatively connected to a shared physical storage space and to one or more host computer devices, each control computer device being assigned with access control to a respective storage area in the shared physical storage space, wherein a control computer device of the one or more control computer devices is configured to:
control a direct write process of a host computer device of the one or more host computer devices to directly write target data to the shared physical storage space, comprising:
responsive to a direct write metadata request from the host computer device, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;
thereby enabling the host computer device to:
calculate respective encryption keys for encrypting the target data corresponding to one or more logical data blocks of the at least one logical volume using a key derivation scheme related to the base key;
encrypt the target data corresponding to the one or more logical data blocks using the respective encryption keys;
write the encrypted target data to the vacant physical location; and
send the control computer device a notification of completion of the direct write process.

8. The storage system of claim 7, further comprising the one or more host computer devices, wherein the host computer device is configured to:
send the direct write metadata request to the control computer device; and
receive, from the control computer device, the metadata pertaining to the at least one logical volume.

9. The storage system of claim 8, wherein the host computer device is further configured to:
calculate respective encryption keys for encrypting the target data corresponding to the one or more logical data blocks using a key derivation scheme related to the base key;
encrypt the target data corresponding to the one or more logical data blocks using the respective encryption keys;
write the encrypted target data to the vacant physical location; and
send the control computer device a notification of completion of the direct write process.

10. The storage system of claim 7, wherein the control computer device is further configured to: responsive to the notification from the host computer device, harden the encrypted target data and acknowledge the direct write process.

11. The storage system of claim 7, wherein the control computer device is further configured to: calculate respective decryption keys for decrypting the encrypted target data corresponding to the one or more logical data blocks using the key derivation scheme related to the base key, and decrypt the encrypted target data using the respective decryption keys.

12. The storage system of claim 7, wherein the key derivation scheme includes a one-way function of the base key, ID of the at least one logical volume, and Logical Block Address (LBA) of a respective logical data block.

13. The storage system of claim 12, wherein the one-way function is a cryptographic hash function.

14. The storage system of claim 7, wherein the key derivation scheme includes a one-way function of the base key, ID of the at least one logical volume, Logical Block Address (LBA) of a respective logical data block and write generation of the target data.

15. A computerized method of secured access control to a shared physical storage space in a storage system, the storage system comprising one or more control computer devices operatively connected to the shared physical storage space and to one or more host computer devices, each control computer device being assigned with access control to a respective storage area in the shared physical storage space, the method comprising:
controlling, by a control computer device of the one or more control computer devices, a direct read process of a host computer device of the one or more host computer devices to directly read target data from the shared physical storage space, comprising:
responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;
thereby enabling the host computer device to read the target data from the physical location and decrypt the target data using the key metadata;
wherein the controlling further comprises calculating respective decryption keys pertaining to the one or more logical data blocks using a key derivation scheme related to a base key, the base key assigned to the at least one logical volume, and wherein the key metadata includes the respective decryption keys.

16. The computerized method according to claim 15, wherein the key derivation scheme includes a one-way function of the base key, ID of the at least one logical volume, and Logical Block Address (LBA) of a respective logical data block.

17. A computerized method of secured access control to a shared physical storage space in a storage system, the storage system comprising one or more control computer devices operatively connected to the shared physical storage space and to one or more host computer devices, each control computer device being assigned with access control to a respective storage area in the shared physical storage space, the method comprising:

controlling, by a control computer device of the one or more control computer devices, a direct read process of a host computer device of the one or more host computer devices to directly read target data from the shared physical storage space, comprising:

responsive to a direct read request from the host computer device, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;

thereby enabling the host computer device to read the target data from the physical location and decrypt the target data using the key metadata;

wherein the key metadata includes a base key assigned to the at least one logical volume, and wherein the enabling further comprises: enabling the host computer device to calculate respective decryption keys pertaining to the one or more logical data blocks using a key derivation scheme related to the base key.

18. A computerized method of secured access control to a shared physical storage space in a storage system, the storage system comprising one or more control computer devices operatively connected to the shared physical storage space and to one or more host computer devices, each control computer device being assigned with access control to a respective storage area in the shared physical storage space, the method comprising:

controlling, by a control computer device of the one or more control computer devices, a direct write process of a host computer device of the one or more host computer devices to directly write target data to the shared physical storage space, comprising:

responsive to a direct write metadata request from the host computer device, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;

thereby enabling the host computer device to:
calculate respective encryption keys for encrypting the target data corresponding to one or more logical data blocks of the at least one logical volume using a key derivation scheme related to the base key;
encrypt the target data corresponding to the one or more logical data blocks using the respective encryption keys;
write the encrypted target data to the vacant physical location; and
send the control computer device a notification of completion of the direct write process.

19. The computerized method according to claim 18, wherein the controlling further comprises: responsive to the notification from the host computer device, hardening the encrypted target data and acknowledging the direct write process.

20. The computerized method according to claim 18, wherein the controlling further comprises: calculating respective decryption keys for decrypting the encrypted data corresponding to the one or more logical data blocks using the key derivation scheme related to the base key, and decrypting the encrypted target data using the respective decryption keys.

21. The computerized method according to claim 18, wherein the key derivation scheme includes a one-way function of the base key, ID of the at least one logical volume, and Logical Block Address (LBA) of a respective logical data block.

22. A non-transitory computer readable storage medium tangibly embodying a program of instructions that, when executed by a computer, cause the computer to perform a method of direct reading of a host computer device from a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct read request to a control computer device of the one or more control computer devices, the direct read request indicative of target data corresponding to one or more logical data blocks of at least one logical volume accessible to the host computer device and being encrypted with respective encryption keys assigned to the one or more logical data blocks;

receiving, from the control computer device, metadata pertaining to the one or more logical data blocks, wherein the metadata includes at least physical location of the target data on the shared physical storage space and key metadata to be used for decryption of the target data;

reading the target data from the physical location; and
decrypting the target data using the key metadata;

wherein the key metadata includes a base key assigned to the at least one logical volume, and the method further comprises: calculating respective decryption keys pertaining to the one or more logical data blocks using a key derivation scheme related to the base key.

23. A non-transitory computer readable storage medium tangibly embodying a program of instructions that, when executed by a computer, cause the computer to perform a method of direct writing of a host computer device to a shared physical storage space in a storage system, the storage system comprising one or more control computer devices operatively connected to the shared physical storage space and to one or more host computer devices including the host computer device, each control computer device being assigned with access control to a respective storage area in the shared physical storage space, the method comprising:

sending a direct write metadata request to a control computer device of the one or more control computer devices, the direct write metadata request indicative of at least one logical volume accessible to the host computer device;

receiving, from the control computer device, metadata pertaining to the at least one logical volume, wherein the metadata includes a base key assigned to the at least one logical volume and vacant physical location on the shared physical storage space to be used by the host computer device for writing the target data;

calculating respective encryption keys for encrypting target data corresponding to one or more logical data blocks of the at least one logical volume using a key derivation scheme related to the base key;

encrypting the target data corresponding to the one or more logical data blocks using the respective encryption keys;

writing the encrypted target data to the vacant physical location; and sending the control computer device a notification of completion of the direct write process.

24. A non-transitory computer readable storage medium tangibly embodying a program of instructions that, when executed by a computer, cause the computer to perform a method of controlling direct read access of a host computer device to a shared physical storage space by a control computer device in a storage system, the storage system comprising one or more control computer devices operatively connected to the shared physical storage space and to one or more host computer devices, each control computer device being assigned with access control to a respective storage area in the shared physical storage space, the method comprising:

responsive to a direct read request from the host computer device to directly read target data from the shared physical storage space, the direct read request indicative of the target data corresponding to one or more logical data blocks of at least one logical volume accessible to the host computer device and being encrypted with respective encryption keys assigned to the one or more logical data blocks, transmitting metadata pertaining to the one or more logical data blocks to the host computer device, wherein the metadata includes at least physical location of the target data on the shared physical storage space and key metadata to be used for decryption of the target data;

thereby enabling the host computer device to read the target data from the physical location and decrypt the target data using the key metadata;

wherein the key metadata includes a base key assigned to the at least one logical volume, and wherein the enabling further comprises: enabling the host computer device to calculate respective decryption keys pertaining to the one or more logical data blocks using a key derivation scheme related to the base key.

25. A non-transitory computer readable storage medium tangibly embodying a program of instructions that, when executed by a computer, cause the computer to perform a method of controlling direct write access of a host computer device to a shared physical storage space by a control computer device in a storage system, the storage system comprising one or more control computer devices operatively connected to the shared physical storage space and to one or more host computer devices, each control computer device being assigned with access control to a respective storage area in the shared physical storage space, the method comprising:

responsive to a direct write metadata request from the host computer device to directly write target data to the shared physical storage space, the direct write metadata request indicative of at least one logical volume accessible to the host computer device, transmitting metadata pertaining to the at least one logical volume to the host computer device, wherein the metadata includes a base key assigned to the at least one logical volume and vacant physical location on the shared physical storage space to be used by the host computer device for writing the target data;

thereby enabling the host computer device to:

calculate respective encryption keys for encrypting the target data corresponding to one or more logical data blocks of the at least one logical volume using a key derivation scheme related to the base key;

encrypt the target data corresponding to the one or more logical data blocks using the respective encryption keys;

write the encrypted target data to the vacant physical location; and send the control computer device a notification of completion of the direct write process.

\* \* \* \* \*